US012791089B2

(12) United States Patent
Fukuda et al.

(10) Patent No.: US 12,791,089 B2
(45) Date of Patent: Nov. 10, 2026

(54) AXLE DRIVING DEVICE

(71) Applicant: KANZAKI KOKYUKOKI MFG. CO., LTD., Amagasaki (JP)

(72) Inventors: Toshiyuki Fukuda, Amagasaki (JP); Koji Kiyooka, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 19/044,740

(22) Filed: Feb. 4, 2025

(65) Prior Publication Data

US 2025/0251035 A1 Aug. 7, 2025

(30) Foreign Application Priority Data

Feb. 5, 2024 (JP) ................................ 2024-015936
Nov. 15, 2024 (JP) ................................ 2024-199897

(51) Int. Cl.

| | |
|---|---|
| ***F16H 48/22*** | (2006.01) |
| ***F16D 23/12*** | (2006.01) |
| ***F16H 48/08*** | (2006.01) |
| ***F16H 48/295*** | (2012.01) |
| ***F16H 48/34*** | (2012.01) |
| ***F16H 57/037*** | (2012.01) |

(52) U.S. Cl.
CPC ....... *F16H 48/22* (2013.01); *F16D 2023/123* (2013.01); *F16H 48/08* (2013.01); *F16H 2048/082* (2013.01); *F16H 48/295* (2013.01); *F16H 2048/343* (2013.01); *F16H 57/037* (2013.01)

(58) Field of Classification Search
CPC .. F16H 48/08–11; F16H 48/22; F16H 48/295; F16H 48/30–2048/346; F16H 57/037; F16H 2023/123
See application file for complete search history.

(56) References Cited

U.S. PATENT DOCUMENTS

| | | | | |
|---|---|---|---|---|
| 7,278,945 | B2 | 10/2007 | Hamrin et al. | |
| 7,390,278 | B2 * | 6/2008 | Krisher | F16H 48/295 475/231 |
| 9,476,492 | B2 * | 10/2016 | Cooper | F16H 48/22 |
| 9,885,415 | B2 * | 2/2018 | Nahrwold | F16H 57/0457 |
| 10,234,009 | B2 * | 3/2019 | Imafuku | F16H 48/08 |
| 10,571,007 | B2 * | 2/2020 | Ziech | B60K 17/3462 |
| 10,697,534 | B2 * | 6/2020 | Guarino | F16H 57/0457 |

(Continued)

*Primary Examiner* — James J Taylor, II
(74) *Attorney, Agent, or Firm* — CANTOR COLBURN LLP

(57) ABSTRACT

[Problem] To provide an axle driving device with a locking differential gear assembly, wherein the pressing force from the clutch pack does not act on the bearings of a differential case when the differential function is restricted.
[Solution] The clutch pack includes a clutch housing, a first friction plate, a second friction plate, and a reaction plate, the clutch housing is engaged with the differential case relatively non-rotatably and axially movably, the friction plates are engaged with an axle and the clutch housing, respectively, relatively non-rotatably and axially movably and in a superposed manner, the reaction plate adjacent to the friction plates can freely press them, and the clutch housing is disposed opposite to the reaction plate to face a wall, and a first thrust bearing is disposed therebetween.

4 Claims, 15 Drawing Sheets

(56) References Cited

U.S. PATENT DOCUMENTS

| | | | | |
|---|---|---|---|---|
| 12,372,146 | B1 * | 7/2025 | Kenmotsu | F16H 48/22 |
| 2009/0093333 | A1 * | 4/2009 | Adams, III | F16H 48/22<br>475/88 |
| 2015/0057125 | A1 * | 2/2015 | Pump | F16H 48/08<br>475/160 |
| 2025/0144998 | A1 * | 5/2025 | Cheng | F16H 57/037 |

* cited by examiner

AXLE DRIVING DEVICE

CROSS REFERENCE TO RELATED APPLICATIONS

The present invention claims priority under 35 U.S.C. § 119 to Japanese Application No. 2024-015936, filed on Feb. 5, 2024, and to Japanese Application No. 2024-199897, filed on Nov. 15, 2024, the entire contents of which being incorporated herein by reference.

TECHNICAL FIELD

The present disclosure relates to an axle driving device equipped with a locking differential gear assembly.

BACKGROUND ART

Conventionally, an axle driving device used in vehicles such as an all-terrain vehicle (ATV) and a utility terrain vehicle (UTV) has had a differential gear, which is used to transmit power from an engine to a pair of left and right front wheels or rear wheels, and at the same time which allows each wheel to differentiate rotation speeds of each wheel. By the differential gear, during a turning drive, an automatic power distribution is caused between turning outside wheels with a smaller ground load and turning inside wheels with a larger ground load to realize a smooth turning. However, when one-side wheel(s) is derailed during a bad road driving, all of the power is concentrated on the derailed-side wheels, and driving force of non-derailed-side wheels is lost, so that the vehicle cannot escape from the bad road. In order to address the circumstance, a locking differential gear assembly is usually formed so as to directly couple the left and right wheels by coupling one-side axle and a differential case using a coupling dog, a spline, or the like. However, in the conventional locking mechanism, since only two states, which are a coupled state and a non-coupled state, can be set, it has been impossible for the conventional automatic locking mechanism which operates only when a wheel slip is detected to be used effectively.

Accordingly, as another prior technique, there is a locking differential gear assembly having a friction-type clutch pack instead of the coupling dog. Specifically, a friction plate on the driving side is engagingly locked with the differential case so as to be relatively non-rotatable and axially movable, and the friction plate on the driven side is engaged with one-side axle so as to be relatively non-rotatable and axially movable, and both the friction plates are superposed. A reaction plate which is operable to be manually axially moved is provided so as to be supported on the side wall of the axle housing, and a pressing force of the friction plate by the reaction plate is changed, whereby the differential function can be steplessly restricted. The reaction plate is operated to rotate by an electric motor within an angular range of several tens of degrees. A rotational angle of the reaction plate is converted into force for moving the reaction plate in the axial direction by a ball ramp mechanism disposed between an inner wall of the axle housing and the reaction plate. As a result, the pressing degree of the friction plate changes, so that the differential function is restricted. When the pressing degree is maximized so that the friction plates become to be non-rotatable relatively to each other, the differential is locked.

PRIOR ART DOCUMENT

Patent Document

Patent Document 1: U.S. Pat. No. 7,278,945

SUMMARY OF INVENTION

Technical Problem

However, the differential case equipped with a clutch pack with the differential function restricted is supported by the axle housing via a bearing. A force generated by the reaction plate pressing the friction plate is transmitted to the bearing through the differential case. At this time, a high load acts on the rolling elements of the bearing, so that wear deterioration is likely to occur. As a result, it becomes a cause to significantly reduce the durability of the bearing. In addition, when the pressing force acts on the bearing, a meshing state of a ring gear attached to the differential case cannot be properly maintained, thereby increasing the possibility of power transmission loss and occurrence of damage to the gear. Therefore, it is necessary to frequently perform backlash adjustment, and to provide an adjustment shim or the like for the purpose.

In view of the above-mentioned circumstances, an object of the present disclosure is to provide an axle driving device having a locking differential gear assembly in which a differential function is restricted, wherein a bearing for supporting a differential case is protected from an excessive load without receiving a pressing force from a reaction plate by the differential case, thereby increasing the durability of the bearing.

Solution to Problem

The problem to be solved by the present disclosure is as described above and means for solving the problems will be described below.

In a scope of the present disclosure, an axle driving device with a locking differential gear assembly having a clutch pack for restricting a differential function of a pair of right and left axles in an axle housing for rotatably bearing-supporting a differential case in which the pair of right and left axles are disposed, wherein the clutch pack includes a clutch housing, a first friction plate, a second friction plate, and a reaction plate, the clutch housing is engaged with the differential case so as to be relatively non-rotatable and axially movable, the second friction plate is engaged with the clutch housing and the first friction plate is engaged with one of the pair of right and left axles so that the first friction plate and the second friction plate are relatively non-rotatable and axially movable and are arranged in a superposing manner, the reaction plate is disposed adjacent to the first friction plate and the second friction plate and can freely press the first friction plate and the second friction plate, and the clutch housing is disposed opposite to the reaction plate across the first friction plate and the second friction plate so as to face a wall of the axle housing, and a first thrust bearing is disposed therebetween.

In the axle driving device disclosed in the present disclosure, it is preferable that the differential case includes an end that extends farther outward than the wall of the axle housing that rotatably bearing-supports the differential case, and the clutch housing is connected to the end so as to be relatively non-rotatable and axially movable.

In the axle driving device disclosed in the present disclosure, it is preferable that a clutch hub fitted to one of the pair of right and left axles so as to be relatively non-rotatable is provided radially inside the clutch housing, and the first friction plate is engaged with the clutch hub so as to be relatively non-rotatable and axially movable, and a first sensor to detect a rotational speed of the clutch hub and a second sensor to detect a rotational speed of the clutch housing are provided.

In the axle driving device disclosed in the present disclosure, it is preferable that a ball ramp mechanism that generates a pressing force to press the first friction plate and the second friction plate when the reaction plate is rotated is provided between the reaction plate and the axle housing, and an energizing member is provided to hold the reaction plate at a position away from the first friction plate and the second friction plate when the reaction plate is at a rotational position where the reaction plate does not press the first friction plate and the second friction plate, and to release the holding of the reaction plate when the reaction plate is at a rotational position where the reaction plate presses the first friction plate and the second friction plate.

In the axle driving device disclosed in the present disclosure, it is preferable that the energizing member includes a first energizing member that rotationally displaces the reaction plate from a state where the reaction plate presses the first friction plate and the second friction plate to a state where the reaction plate does not press the first friction plate and the second friction plate, and a second energizing member that generates an axial thrust to separate the reaction plate from the first friction plate and the second friction plate.

In the axle driving device disclosed in the present disclosure, it is preferable that the second energizing member includes a base end to fix the second energizing member to the axle housing, a holder to hold the reaction plate at an axial position spaced apart from the first friction plate and the second friction plate, a tip provided apart from the base end in a rotational direction and an axial direction, and a guide that is formed in an inclined shape between the holder and the tip.

Advantageous Effects of Invention

According to the present disclosure, when pressing force from a reaction plate 37 acts on friction plates 31 and 32 and a clutch housing 34, the pressing force is received by a wall 3*b* of an axle housing 3 via a first thrust bearing 25. Therefore, it is possible to suppress components associated with the locking differential gear assembly, such as a differential case 12 and a second bearing 22 from being affected by the pressing force. It is possible to reduce a high load acting on each of components, and thus it makes it possible to prolong the service life of each of components.

DESCRIPTION OF EMBODIMENTS

First Embodiment

Figure 1:
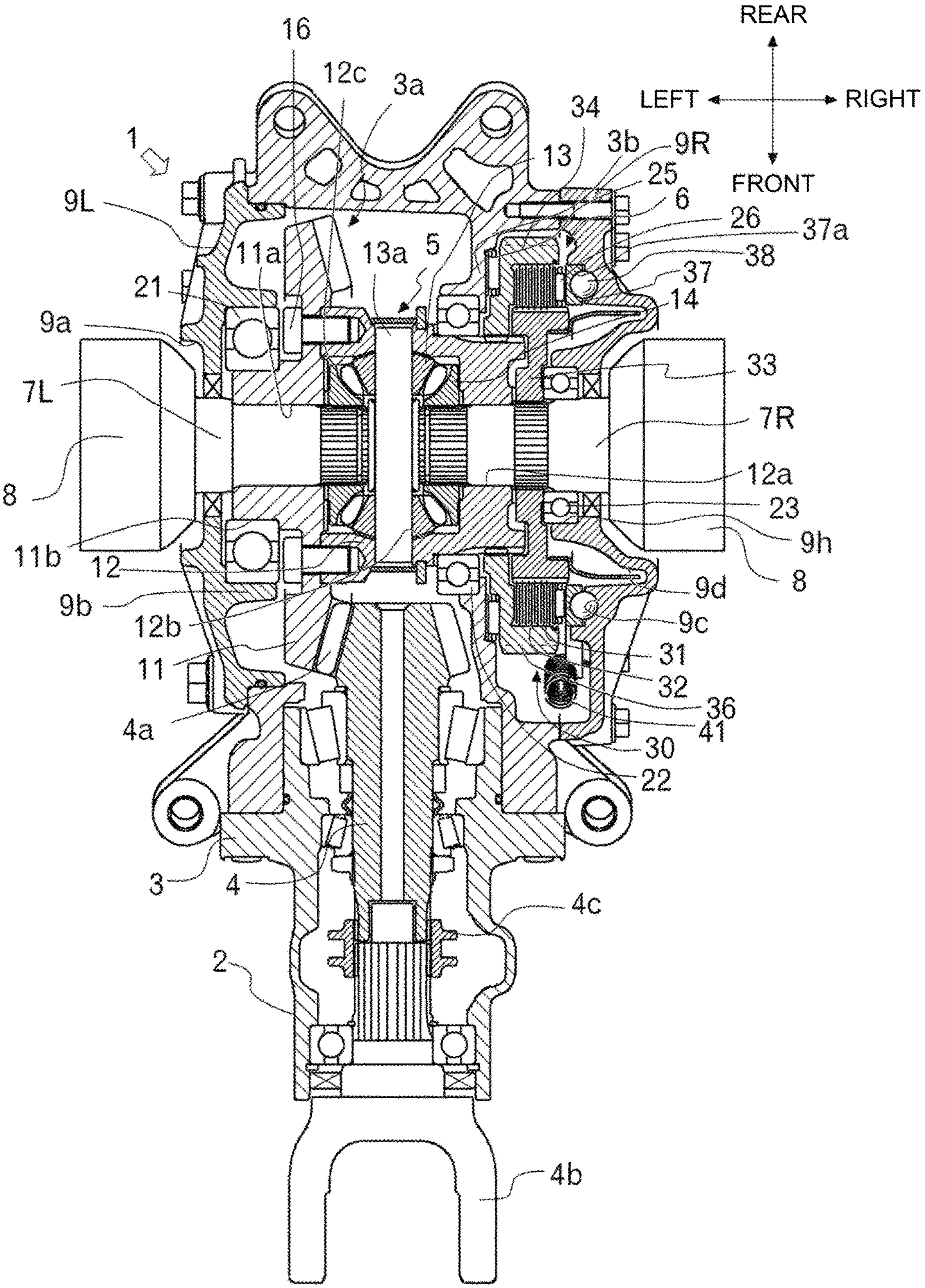
FIG. 1 is a plan view showing an axle driving device according to an embodiment of the present disclosure.

Now, an axle driving device 1 according to an embodiment of the present disclosure is described. FIG. 1 is a plan view showing the axle driving device. In the following description with reference to FIG. 1, as viewed from the paper, a lower direction and an upper direction are defined as a front and a rear of the axle driving device 1, respectively. Also, as viewed from the paper, a right-left direction is defined as a right-left direction of the axle driving device 1. Here, the axle driving device 1 shown in FIG. 1 is a device which transmits power from an engine to rear wheels which are driving wheels. Note that the axle driving device 1 is not limited thereto, and, for example, the axle driving device 1 may be provided on the front wheel side in a four-wheel-drive vehicle in which front wheels and rear wheels are used as driving wheels. The axle driving device 1 includes a front housing portion 2 connected to a front wheel driving shaft extending from a rear axle driving device (not shown) provided on the rear side of a vehicle body which is not shown, and an axle housing 3 to which the front housing portion 2 is coupled.

An input shaft 4 connected to a main shaft is housed in the front housing portion 2. The input shaft 4 projects into the axle housing 3, and a small bevel gear 4*a* provided on the rear end of the input shaft 4 is connected to a locking differential gear assembly 5 disposed in the axle housing 3. Note that reference numeral 4*b* denotes a joint portion which connects the input shaft 4 to the front wheel driving shaft (not shown). Reference numeral 4*c* denotes a clutch-shifter capable of connecting and disconnecting power from the front wheel driving shaft (not shown) to and from a locking differential gear assembly 5 which is described later and is operated to slide in a power-on or power-off direction by an electric-actuator 4*d* mounted on a front housing portion 2 shown in FIG. 2.

A gear chamber 3*a* is provided inside the axle housing 3. The locking differential gear assembly 5 and a locking mechanism 6 are provided in the gear chamber 3*a*.

The axle housing 3 supports a left axle (first axle portion) 7L and a right axle (second axle portion) 7R. The locking differential gear assembly 5 includes a ring gear 11 like a bevel gear which receives power from the small bevel gear 4*a* and is configured to output the input power to the left axle 7L and the right axle 7R. Cups 8, 8 connected to a constant speed universal joint (outside the drawing) are provided at end portions of the left axle 7L and the right axle 7R. The constant speed universal joint is connected to a wheel shaft of a driving wheel (not shown), and power from the left axle 7L and power from the right axle 7R are transmitted to the driving wheels, respectively.

Figure 2:
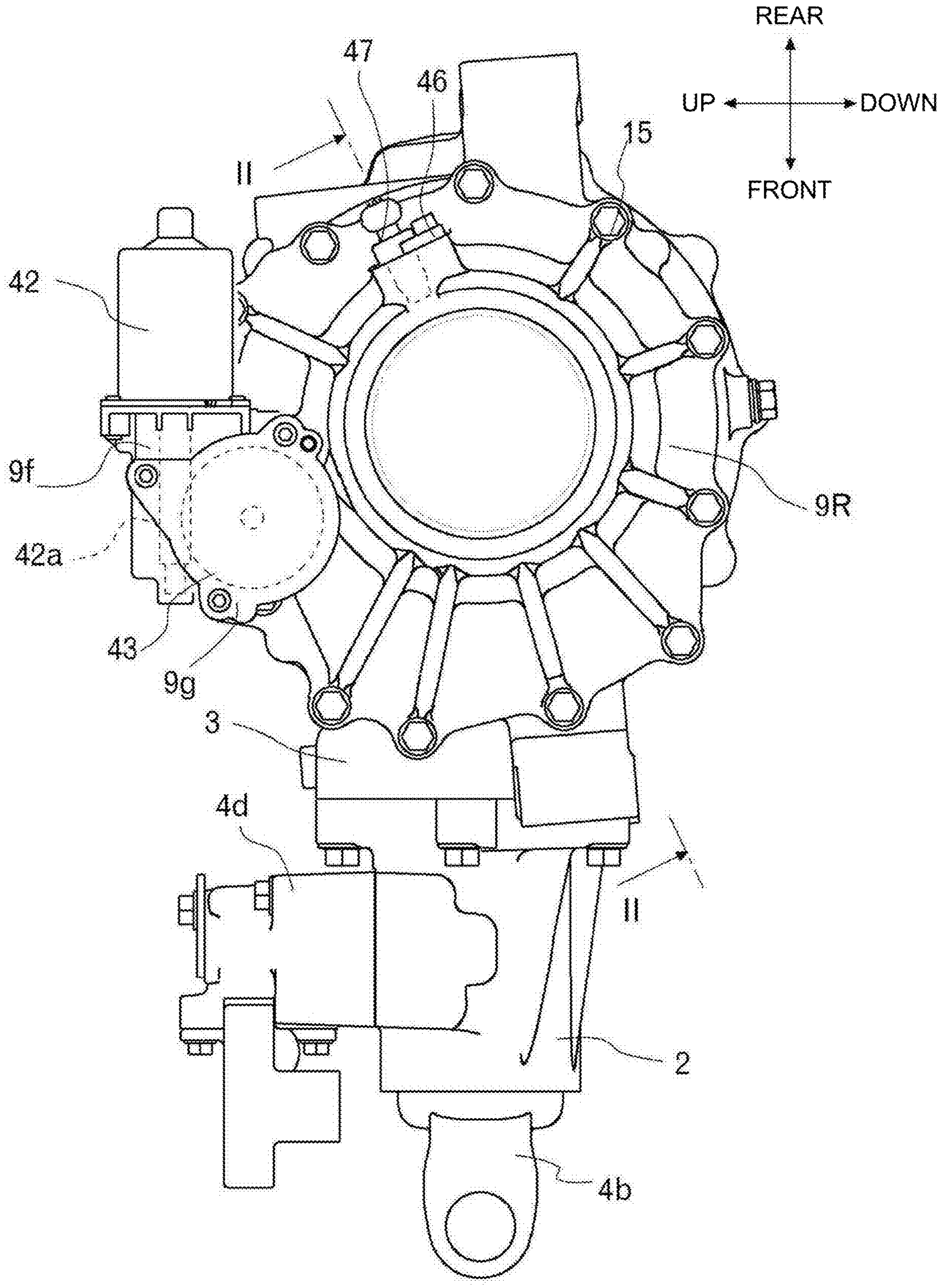
FIG. 2 is a right side view showing the axle driving device according to the embodiment of the present disclosure.
Figure 3:
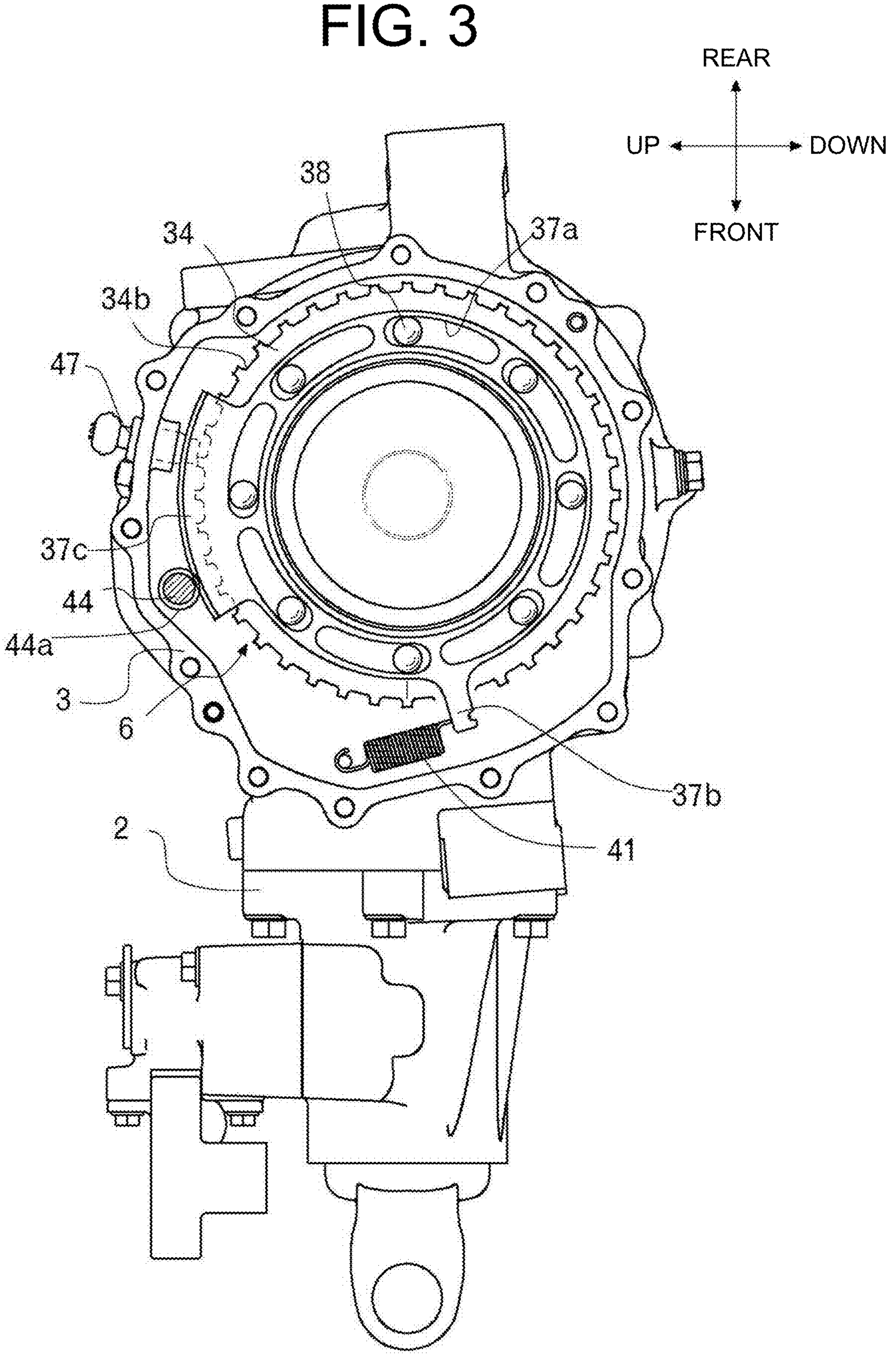
FIG. 3 is a right side view showing the axle driving device with an axle cover removed, according to the embodiment of the present disclosure.

As shown in FIG. 1 and FIG. 2, detachable axle covers 9L and 9R are formed on both left and right surfaces of the axle housing 3. A cup storage portion 9*a* for storing cups 8, 8 connected to a constant speed universal joint is provided at the axle covers 9L and 9R. Furthermore, as shown in FIG. 2 and FIG. 3, the right axle cover 9R is fixed to the axle housing 3 by a cover fixing member 15. The cover fixing member 15 is a screw and is configured to be detachable freely.

Inner end portions of the left axle 7L and the right axle 7R are connected to the locking differential gear assembly 5 in the gear chamber 3*a*. For the detail, the inner end portions of the left axle 7L and the right axle 7R are fitted into an axial core hole 11*a* of the ring gear 11 in the locking differential gear assembly 5 and face each other. The left axle 7L is extended to a left direction outside from the locking differential gear assembly 5, the right axle 7R is extended to a right direction outside from the locking differential gear assembly 5, and cups 8, 8 connected to the constant speed universal joints are provided on the left axle 7L and the right axle 7R, respectively.

Figure 4:
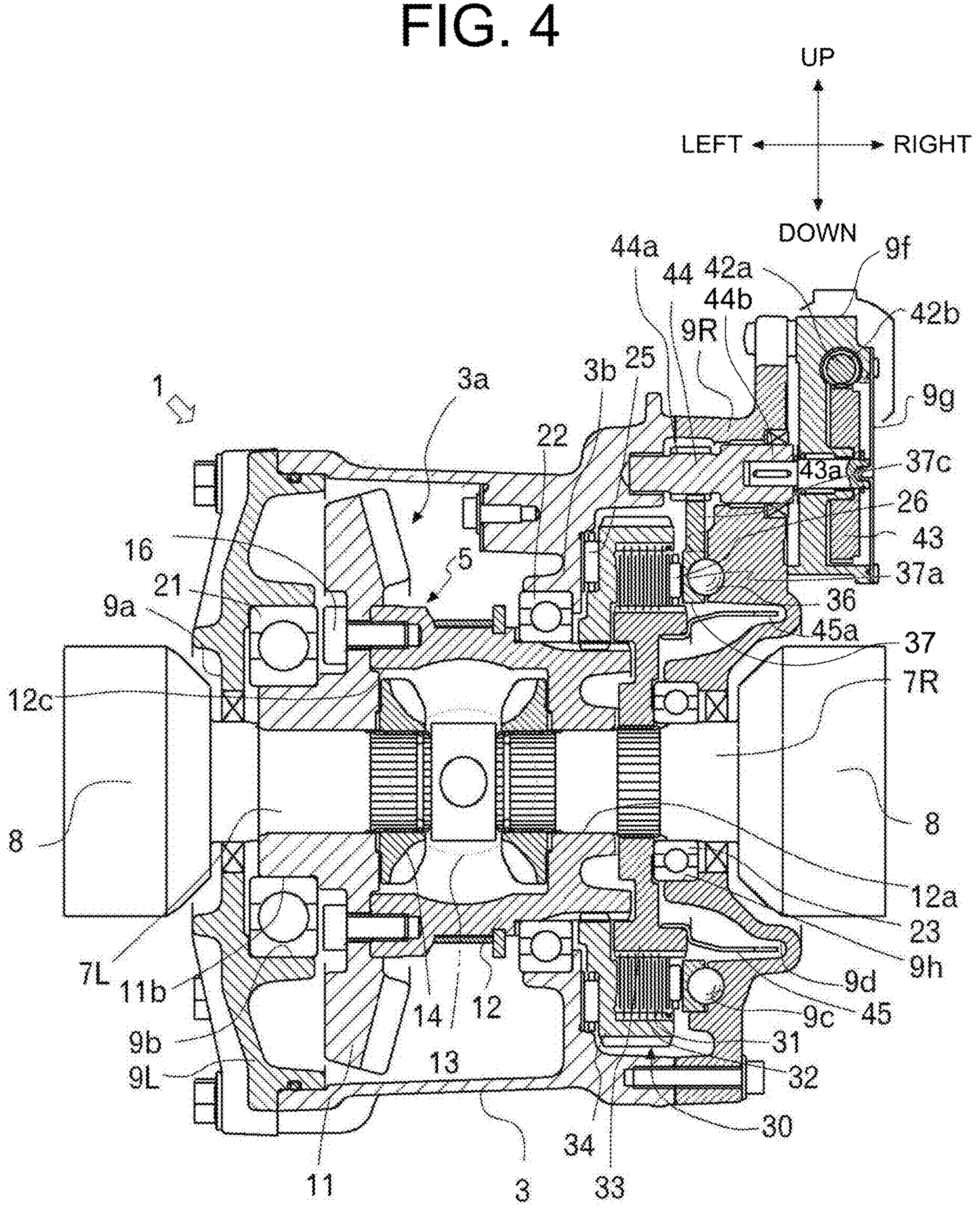
FIG. 4 is a partial cross-sectional front view showing the axle driving device according to the embodiment of the present disclosure.

As shown in FIG. 1 and FIG. 4, the locking differential gear assembly 5 includes the ring gear 11, a differential case 12, two pinion gears 13, 13, and two side gears 14, 14. The ring gear 11 has the axial core hole 11*a*. The axial core hole 11*a* is a through hole formed at a rotational center of the ring gear 11 and receives the left axle 7L. The ring gear 11 is connected to the differential case 12 by a fixing member 16 which is a screw so as to be integrally rotatable.

As shown in FIG. 1 and FIG. 4, a bearing surface 11*b* which abuts to a first bearing 21 is provided on the left-side surface, that is, on a wheel-side surface of the ring gear 11. A bearing-supporting surface 9*b* for supporting the first bearing 21 is provided on the inner surface of the left axle cover 9L.

The differential case 12 has an axial core hole 12*a*, two pinion gear holes 12*b*, and two side-gear holes 12*c*. The axial core hole 12*a* is a through hole formed in the rotational center portion of the differential case 12 and receives the right axle 7R. The pinion gear holes 12*b* are through holes formed on both sides of the axial core hole 12*a* and receive the pinion gear 13.

Each of the pinion gears 13, 13 is a bevel gear having a support shaft 13*a* fitted into a pinion gear hole 12*b* of the differential case 12 and is housed in the differential case 12. The pinion gears 13, 13 are housed in the differential case 12 and supported so as to be rotatable while revolving integrally with the rotation of the ring gear 11.

The side gears 14, 14 are bevel gears which are disposed in the side-gear holes 12*c* of the differential case 12 and spline-fitted to the left axle 7L and the right axle 7R. The side gears 14, 14 are meshed with the pinion gears 13, 13, respectively. Each of the left axle 7L and the right axle 7R is relatively rotatable with respect to the differential case 12. When the vehicle body turns, the pinion gears 13, 13 rotate, whereby the rotational speeds of the left and right side gears 14, 14 can be changed independently. According to such a differential mechanism 5, the left axle 7L and the right axle 7R can be differentially rotated.

Figure 5:
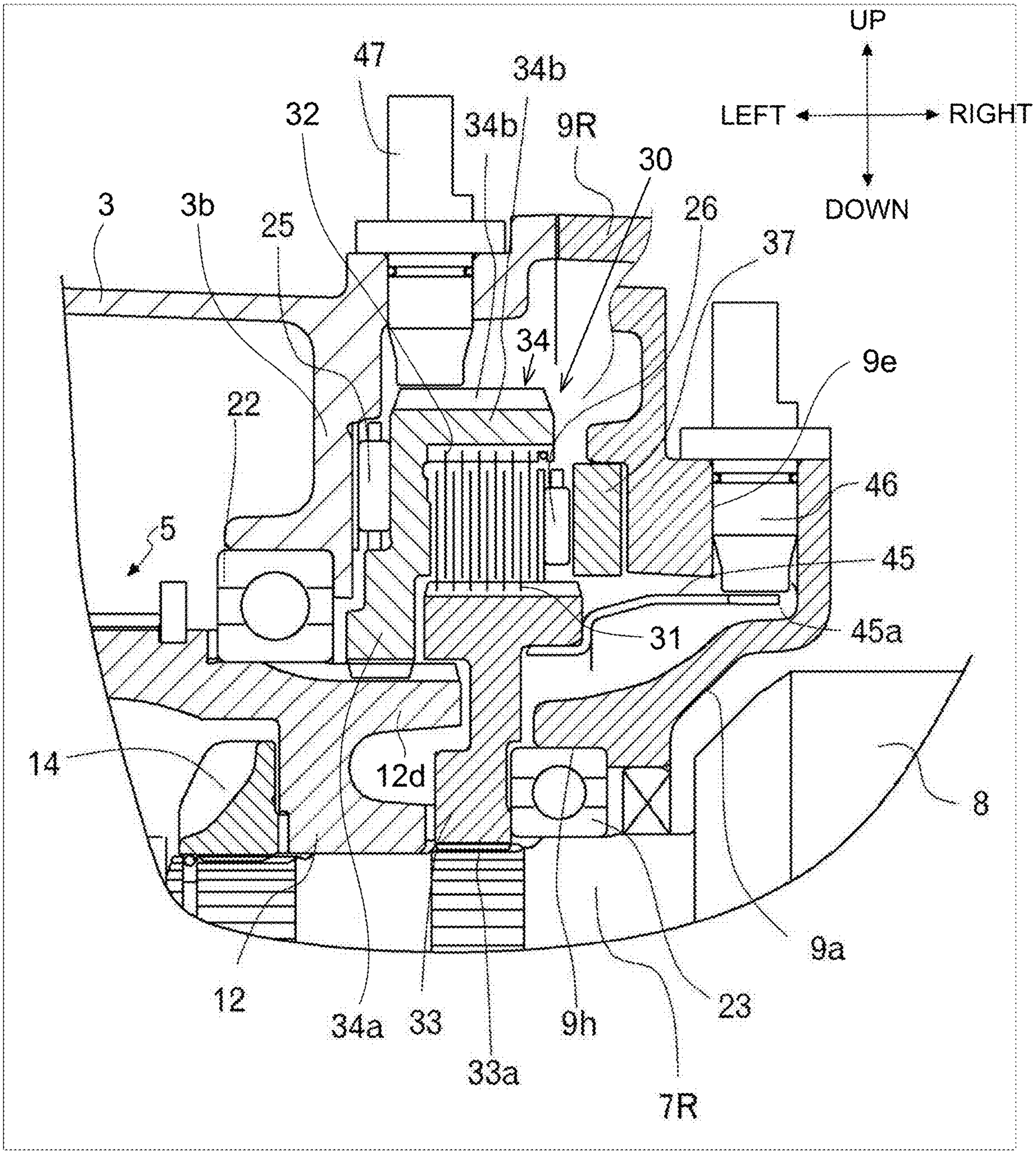
FIG. 5 is a partially enlarged cross-sectional view taken along line II-II in FIG. 2, showing the axle driving device according to the embodiment of the present disclosure.

As shown in FIGS. 1, FIG. 4, and FIG. 5, the locking mechanism 6 has a clutch pack 30 which restricts a differential function. The clutch pack 30 is constituted by a multi-plate clutch and includes first friction plates 31 and second friction plates 32. The first friction plates 31 and the second friction plates 32 are alternately arranged.

As shown in FIG. 5, an inner circumference of the ring-shaped first friction plate 31 is engaged with a clutch hub 33 which rotates integrally with the right axle 7R via an outer spline provided on the clutch hub 33 so as to be relatively non-rotatable and axially movable. A base portion 33*a* of the clutch hub 33 is spline-fitted to the right axle 7R so as to be relatively non-rotatable and axially non-movable.

As shown in FIG. 5, a clutch housing 34 is disposed on an outer circumstance of the ring-shaped second friction plate 32, and the second friction plate 32 is fitted to the clutch housing 34 via a spline so as to be relatively non-rotatable and axially movable. The differential case 12 has an extended end 12*d* which is formed integrally and extends coaxially on the side of the right axle 7R. The extended end 12*d* projects farther outward than a wall 3*b* of the axle housing 3 and includes a male spline for fitting the outer circumferential surface of the extended end 12*d* to the clutch housing 34 so as to be relatively non-rotatable and axially movable.

The clutch housing 34 has a disc-shaped sidewall portion 34*a* and a cylindrical portion 34*b* formed on an outer circumferential edge of the sidewall portion 34*a*, and the clutch housing 34 also has a female spline which is fitted to the extended end 12*d* of the differential case 12 on an inner circumferential surface of a hole formed in a rotational center of the sidewall portion 34*a*. A female spline which is fitted to the second friction plate 32 is provided on an inner circumferential surface of the cylindrical portion 34*b*. The sidewall portion 34*a* receives the first friction plates 31 and the second friction plates 32 when the first friction plates 31 and the second friction plates 32 move toward the inside of the axle housing 3. The sidewall portion 34*a* face the wall 3*b* of the axle housing 3, and a first thrust bearing 25 is disposed therebetween.

The first thrust bearing 25 is a bearing for supporting the clutch housing 34 so that the clutch housing 34 can rotate smoothly while preventing the clutch housing 34 from axially moving. A bearing having a cylindrical roller as a rolling member is used. Therefore, the wall 3*b* is configured to be able to receive thrust force acting on the first friction plates 31 and the second friction plates 32 via the clutch housing 34.

A second bearings 22 for rotatably supporting the differential case 12 are held on the wall 3*b*. The second bearing 22 is disposed on the outer circumferential surface of the differential case 12 near the right axle 7R side. Furthermore, a gap is provided between the second bearing 22 and a back surface (left side surface) of the clutch housing 34, and when the clutch housing 34 receives the pressing force from the reaction plate 37, the pressing force is never transmitted to the second bearing 22.

As shown in FIG. 4, a ball ramp mechanism 36 for pressing the first friction plates 31 and the second friction plates 32 toward the inside of the axle housing 3 is provided inside the right axle cover 9R. The ball ramp mechanism 36 includes a reaction plate 37 which is disposed coaxially with the right axle 7R so as to be rotatable and axially movable, and a plurality of cam balls 38. A second thrust bearing 26 is disposed between the surface (left side surface) of the reaction plate 37 and the clutch pack 30 (first friction plates 31 and second friction plates 32). The second thrust bearing 26 is a bearing for permitting a relative rotation of both the reaction plate 37 and the clutch pack 30 while receiving pressing force in the rotation axis direction from the reaction plate 37 by the clutch pack 30 and is a bearing having a cylindrical roller as a rolling member.

The reaction plate 37 is formed in a ring shape and is rotatably supported around the right axle 7R and slidably guided in the axial direction on the inner surface of the right axle cover 9R.

Figure 8:
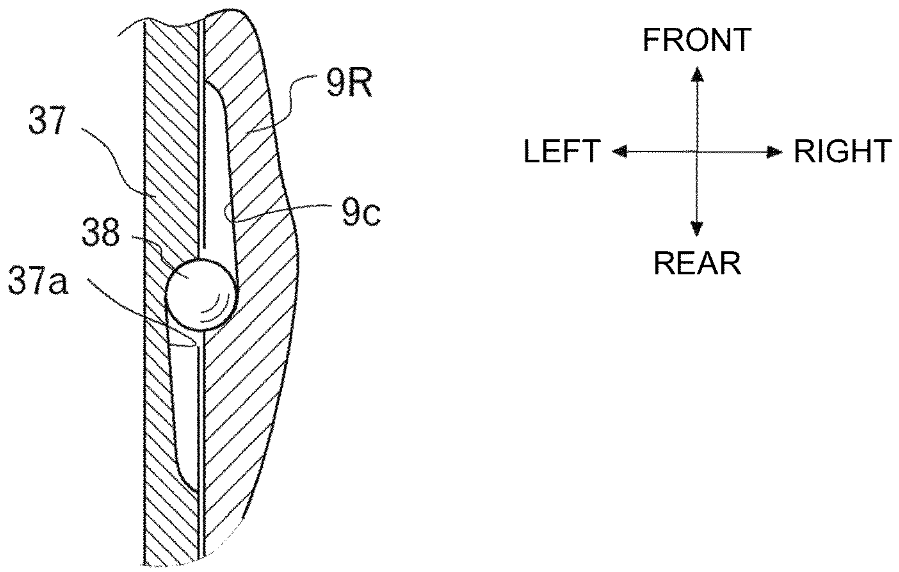
FIG. 8 is a partially enlarged front cross-sectional view showing a reaction plate and a cam ball of the axle driving device according to the embodiment of the present disclosure.

As shown in FIG. 8, a cam surface 37*a* for housing a left half portion of the cam ball 38 is provided on the back surface (right side surface) of the reaction plate 37. The cam surface 37*a* forms a groove which has a circular arc shape along the rotational direction of the reaction plate 37 and depths different in the axial direction. FIG. 8 shows the reaction plate 37 at an initial position when an electric motor 42 described later is not energized. At this time, the cam ball 38 is positioned at the deepest portion of the cam surface 37*a*, and the reaction plate 37 is separated from the first friction plates 31 and the second friction plates 32.

Figure 10:
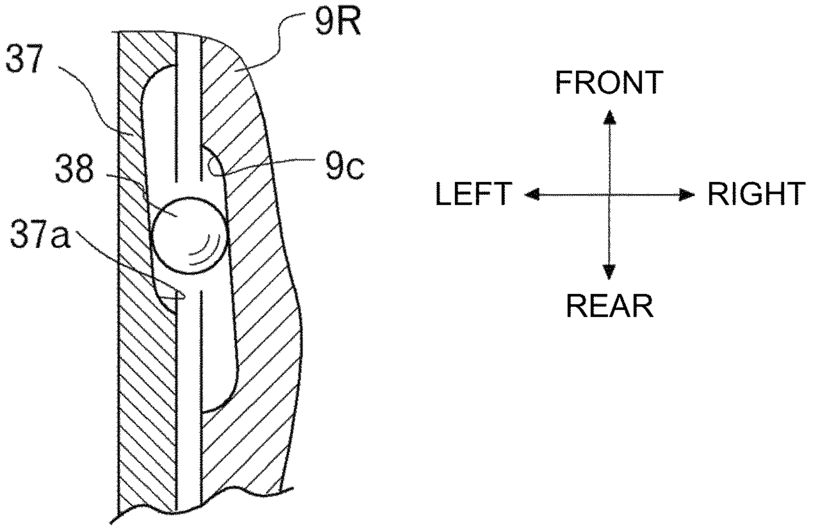
FIG. 10 is a partially enlarged front cross-sectional view showing the reaction plate and the cam ball of the axle driving device according to the embodiment of the present disclosure.

The cam surface 37*a* is formed by an inclined portion whose depth becomes smaller from one side to the other side in the rotational direction of the reaction plate 37, and when the reaction plate 37 is rotated from the other side to the one side, the cam ball 38 riding on a shallow portion moves the reaction plate 37 toward the first friction plates 31 and the second friction plates 32 so that the reaction plate 37 presses the first friction plates 31 and the second friction plates 32. FIG. 10 shows a state where the reaction plate 37 is in the rotation finished position.

Furthermore, a cover-side cam surface 9*c* is provided on the inner surface of the right axle cover 9R facing the reaction plate 37. The cover-side cam surface 9*c* is disposed at a position facing the cam surface 37*a* of the reaction plate 37, and when the reaction plate 37 is at the initial position as shown in FIG. 8, the right half portion of the cam ball 38 is positioned at the deepest portion of the cover-side cam surface 9*c*. As shown in FIG. 10, when the reaction plate 37 moves to the rotation finished position, the cam ball 38 rides on a shallow portion side of the cover-side cam surface 9*c*.

In addition, a third bearing-supporting surface 9*h* for supporting a third bearing 23 is provided on the inner circumferential surface of the right axle cover 9R. The third bearing 23 is a bearing for supporting the right axle 7R.

As shown in FIG. 3, two portions, which are formed so as to project radially outwardly, are provided on the outer circumferential edge of the reaction plate 37. One of them is an arm portion 37*b* on which one end of a coil-shaped tension spring 41 as a first energizing member is hooked, and the other is a sector gear portion 37*c* for transmitting rotational power from an electric motor 42. A pinion gear 44*a* meshes with the sector gear portion 37*c*.

The other end of the tension spring 41 is engaged with the inner surface of the right axle cover 9R. In the reaction plate 37 at a state where the reaction plate 37 is rotated by driving of the electric motor 42, when the electric motor 42 is not operated, energizing force from the extended tension spring 41 acts on the reaction plate 37 so as to cause the reaction plate 37 to rotate in a direction of returning to an initial rotation position.

As shown in FIG. 4 and FIG. 5, a detection cylinder 45 is mounted on the right side of the clutch hub 33. The detection cylinder 45 can be formed by pressing a plate-like metal member into a stepped cup-shaped metal member.

Figure 6:
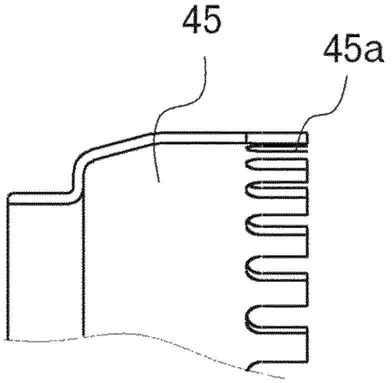
FIG. 6 is a partially enlarged view showing the sensor encoder of the axle driving device according to the embodiment of the present disclosure.

As shown in FIG. 5, a first rotation sensor 46 for detecting the rotation of the detection cylinder 45 is disposed on the outer circumferential side of the detection cylinder 45. As shown in FIG. 6, a U-shaped groove 45*a* is formed at the outer edge portion of the detection cylinder 45. This makes it possible to detect not only the rotational speed of the clutch hub 33 but also the rotational phase. Note that although the grooves 45*a* can be provided at equal intervals, the present disclosure is not limited thereto. For example, it is also possible to skip to form the U-shaped grooves 45*a* only one piece of grooves.

As shown in FIG. 5, a housing recess 9*d* for housing the detection cylinder 45 is provided on the inner surface of the right axle cover 9R. The housing recess 9*d* is formed in an annular shape in the right axle cover 9R, and an attaching hole 9*e* for attaching the first rotation sensor 46 is formed on the radially outer circumferential side of the housing recess 9*d*. The first rotation sensor 46 measures the number of rotations of the clutch hub 33 and the rotational speed of the right axle 7R via the detection cylinder 45 and transmits the signal to a controller outside the drawing.

As shown in FIG. 5, a second rotation sensor 47 for detecting the rotation of a sensor projection 34*b* formed on the outer circumferential surface of the clutch housing 34 is disposed in the axle housing 3. The sensor projection 34*b* is provided in an uneven shape on the outer circumferential surface of the clutch housing 34. The second rotation sensor 47 measures the number of rotations of the clutch housing 34 and the rotational speed of the differential case 12 and transmits the signal to the controller outside the drawing.

As shown in FIG. 2 and FIG. 5, the first rotation sensor 46 and the second rotation sensor 47 are arranged close to each other on the right side surface of the axle housing 3, that is, on the right axle cover 9R. Such a configuration allows the arrangement of the sensors to be uncomplicated, and assembly, maintenance, and wiring connection operations can be easily and intensively performed on the right axle 7R side.

The controller (not shown) can know a differential status of the locking differential gear assembly 5 if the relationship between the rotational speed of the differential case 12 and the rotational speed of the right axle 7R is recognized, and can turn ON/OFF the locking mechanism 6 by driving the electric motor 42 described later, in response to a request from a driver, or can partially restrict the differential function.

Furthermore, as shown in FIG. 2 and FIG. 4, a motor case 9*f* is further attached to the right axle cover 9R. The motor case 9*f* supports the electric motor 42 on the rear side of the motor case 9*f* and houses a motor gear 42*b* formed integrally with a driving shaft 42*a* of the electric motor 42 and a transmission gear 43 meshing with the motor gear 42*b*. The reference numeral 9*g* indicates a lid to close a side opening of the motor case 9*f* which houses the transmission gear 43.

An input end portion 44*b* of a driving shaft for the reaction plate 44 faces an attaching surface of the motor case 9*f* in the right axle cover 9R. When the motor case 9*f* is attached, an output shaft 43*a* of the transmission gear 43 is connected to the input end portion 44*b*. A pinion gear 44*a* meshing with the sector gear portion 37*c* of the reaction plate 37 is provided integrally with the reaction plate driving shaft 44. When the electric motor 42 is driven, the rotational torque generated in the driving shaft 42*a* is transmitted to the driving shaft for the reaction plate 44, and the pinion gear 44*a* causes the reaction plate 37 to rotate.

As shown in FIG. 7 to FIG. 10, in a period through which the reaction plate 37 is rotated by driving of the electric motor 42 to move from the initial position to the rotation finished position, the cam ball 38 rides on the shallow portion of the cam surface 37*a* and the shallow portion of the cover-side cam surface 9*c* due to a relative rotation difference occurred between the cam surface 37*a* and the cover-side cam surface 9*c*, whereby force pressing the first friction plates 31 and the second friction plates 32 is generated in the reaction plate 37. When the reaction plate 37 rotates to the rotation finished position, the amount of axial projection of the reaction plate 37 becomes maximum, so that the amount of torque transmission between the first friction plates 31 and the second friction plates 32 becomes maximum, whereby the differential case 12 and the right axle 7R are locked and the differential operation never causes between the left axle 7L and the right axle 7R.

Figure 7:
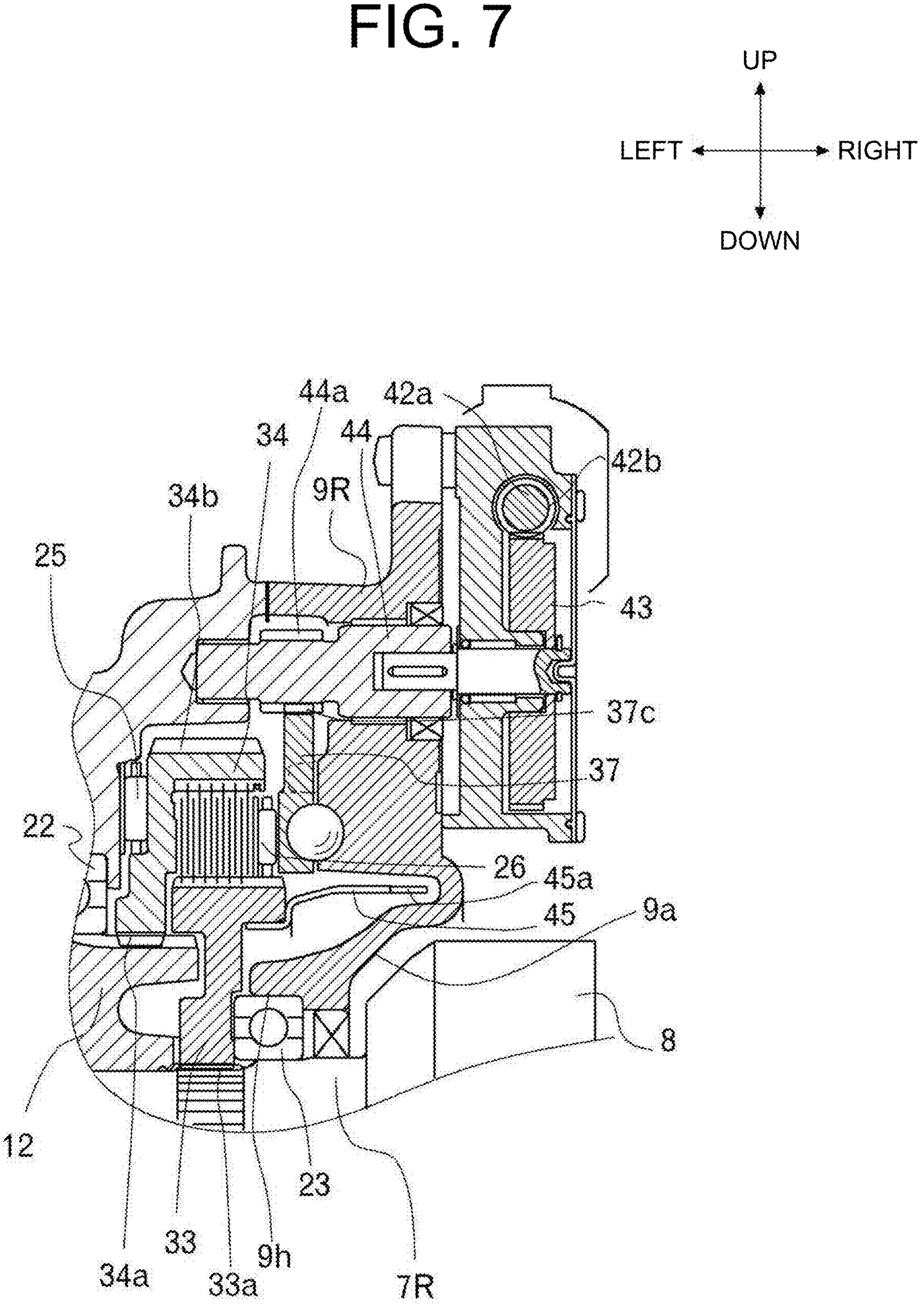
FIG. 7 is a partially enlarged front cross-sectional view showing the axle driving device according to the embodiment of the present disclosure.

Next, a rotational differential operation control of the left and right driving wheels of the traveling vehicle equipped with such the locking mechanism 6 is described below. For example, in order to enable the vehicle to turn smoothly on a road surface with a good traction, as shown in FIG. 7 and FIG. 8, the function of the locking mechanism 6 is released and the left and right axles 7L and 7R become differentially operable by the locking differential gear assembly 5.

Figure 9:
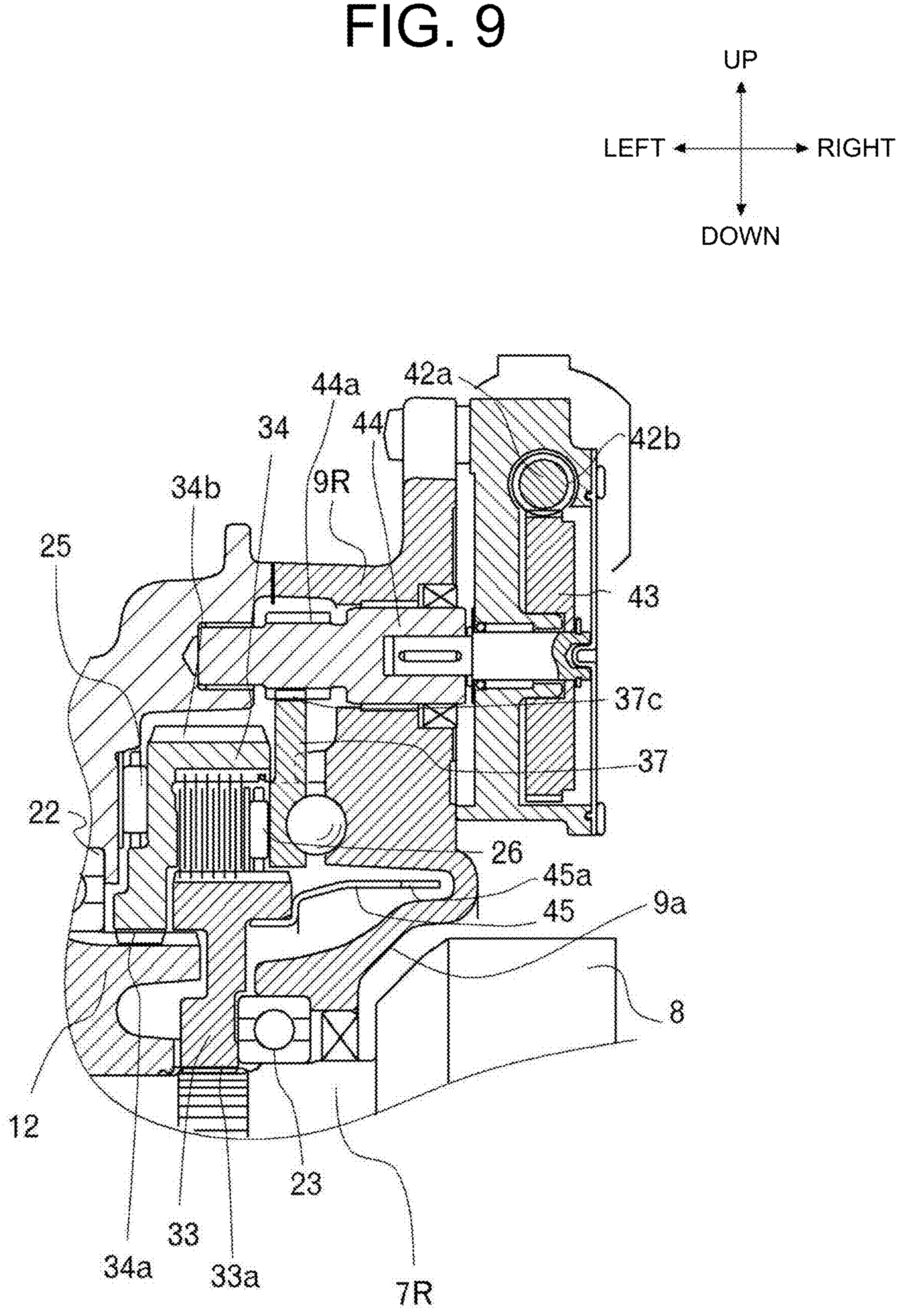
FIG. 9 is a partially enlarged front cross-sectional view showing the axle driving device according to the embodiment of the present disclosure.

On the other hand, in a case where a straight traveling, which does not require generation of a differential operation between the left and right wheels to avoid a stuck on a bad road, for example, is performed, as shown in FIG. 9 and FIG. 10, if the locking mechanism 6 is driven so as to rotate the reaction plate 37 to the rotation finished position, the differential function of the locking differential gear assembly 5 is interrupted and the left and right axles 7L and 7R can be integrated (diff-locked).

The amount of axial movement of the reaction plate 37 toward the first and second friction plates 31 and 32 can be adjusted by adjusting the driving amount of the electric motor 42 and rotating the reaction plate 37 to an intermediate state (before reaching the rotation finished position). For example, when the vehicle speed is low, the vehicle travels with the differential lock being applied. As the vehicle speed increases, the amount of axial movement of the reaction plate 37 is reduced to allow the vehicle to conduct a restricted differential rotation between the left and right axles 7L and 7R. When the vehicle speed becomes sufficient, the differential lock is completely released. Alternatively, the pressing force of the reaction plate 37 may be changed based on the relationship between the vehicle speed and the steering operation amount.

When the reaction plate 37 is axially moved toward the first and second friction plates 31 and 32 side, the pressing force is applied to the first and second friction plates 31 and 32 via the second thrust bearing 26 which abuts to the reaction plate 37. The axial pressing force applied to the clutch housing 34 is received by the wall 3*b* via the first thrust bearings 25 disposed on the left side surface of the clutch housing 34. Furthermore, there is a gap between the left side surface of the clutch housing 34 and the second bearing 22. This allows the entire pressing force to be received by the axle housing 3, and the influence of the axial pressing force on the differential case 12 and the second bearing 22 is eliminated, so that the load applied to the differential case 12 and the second bearing 22 is reduced.

Furthermore, it is often the case where when one of the wheels is not in contact with the ground and idles on the bad road, the vehicle cannot escape. In this case, the driving force is transmitted only to the idling wheel and no driving force is transmitted to the non-idling wheel by the differential function of the locking differential gear assembly 5, so that the vehicle cannot move. Then, by forcing the locking mechanism 6 to be driven, the driver may stop the differential function of the locking differential gear assembly 5.

Specifically, the electric motor 42 is driven to rotate the reaction plate 37 at the maximum amount, thereby maximizing a torque transmission amount between the first and second friction plates 31 and 32. This allows the driving force to be transmitted to the wheels which are not in contact with the ground, so that the vehicle can escape from the bad road.

Furthermore, it may be necessary to restrict the differential function of the left and right wheels in order to improve the traveling stability. For example, when the vehicle travels meanderingly on the bad road, it is predicted that one of the wheels slips. In such a case, the vehicle may travel with the differential function restricted. That is, the torque transmission amount between the first and second friction plates 31 and 32 is intentionally reduced by adjusting the amount of pressing force of the reaction plate 37 of the locking mechanism 6.

As the operation condition of the locking mechanism 6, for example, the locking mechanism 6 may be controlled so as to be automatically operated only when a difference in rotation between the right and left axles is detected to be equal to or larger than a preset value.

In this case, the electric motor 42 is driven by a predetermined amount to adjust a rotation angle of the reaction plate 37, thereby setting a pressing stroke of the reaction plate 37 against the first and second friction plates 31 and 32 in accordance with the rotation angle. This allows the differentiating function of the locking differential gear assembly 5 to be partially restricted, thereby suppressing the reduction of the driving force due to the wheel slippage.

As mentioned in the foregoing, according to the present disclosure, an axle driving device 1 is provided, which has a locking differential gear assembly 5 having a clutch pack 30 for restricting a differential function of a pair of right and left axles 7R and 7L in an axle housing 3 for rotatably bearing-supporting a differential case 12 in which the pair of right and left axles 7R and 7L are disposed, wherein the clutch pack 30 includes a clutch housing 34, a first friction plate 31, a second friction plate 32, and a reaction plate 37, and the clutch housing 34 is engaged with the differential case 12 so as to be relatively non-rotatable and axially movable.

The second friction plate 32 is engaged with the clutch housing 34 and the first friction plate 31 is engaged with the right axle 7R so that the first and second friction plates 31 and 32 are relatively non-rotatable and axially movable and the first and second friction plates 31 and 32 are arranged in a superposing manner. The reaction plate 37 is disposed adjacent to the first and second friction plates 31 and 32 and is configured to press the first and second friction plates 31 and 32 freely. The clutch housing 34 is disposed opposite to the reaction plate 37 across the friction plates 31 and 32 so as to face the wall 3*b* of the axle housing 3, and the first thrust bearing 25 is disposed between the wall 3*b* and the clutch housing 34.

Such a configuration allows the pressing force to be received by the wall 3*b* of the axle housing 3 via the first thrust bearings 25 when the reaction plate 37 applies the pressing force to the first and second friction plates 31 and 32 and the clutch housing 34. Therefore, it is possible to suppress components associated with the locking differential gear assembly, such as the differential case 12 and the second bearing 22 from being affected by the pressing force. It is possible to reduce a high load acting on each of components, and thus it makes it possible to prolong the service life of each of components.

Furthermore, the differential case 12 is provided with an end 12*d* extending farther outward than the wall 3*b* of the axle housing 3 which rotatably bearing-supports the differential case 12, and the clutch housing 34 is connected to the end 12*d* so as to be relatively non-rotatable and axially movable.

Such a configuration allows the clutch housing 34 to be easily assembled to the differential case 12 and allows the clutch housing 34 to be disposed so as to face the wall 3*b* of the axle housing 3, so that it is possible to secure a place to mount the first thrust bearing 25 avoiding an interference with the second bearing 22.

A clutch hub 33 fitted to the right axle 7R so as to be relatively non-rotatable is provided inside in the radial direction with respect to the clutch housing 34, the first friction plate 31 is engaged with the clutch hub 33 so as to be relatively non-rotatable and axially movably, and the first sensor for detecting the rotational speed of the clutch hub and the second sensor for detecting the rotation number of the clutch housing are provided.

Such a configuration allows the arrangement of the first rotation sensor 46 and the second rotation sensor 47 to be uncomplicated, and assembly and maintenance operations can be intensively and efficiently performed on the right axle 7R side.

Furthermore, the detection cylinder 45 for detecting a rotation state by the first rotation sensor 46 is fixed to the clutch hub 33, and the detection cylinder 45 is disposed in the housing recess 9*d* provided in the right axle cover 9R.

Such a configuration allows the axial width when the detection cylinder 45 is disposed to be shorten, thereby reducing the size of the axle housing 3.

Although the embodiment according to the present disclosure has been described above, the present disclosure is not limited to such the embodiment and the embodiment is merely example. It goes without saying that the present disclosure can be implemented in further various forms in a range without departing from the scope of the present disclosure. The scope of the present disclosure is indicated by the statement of the claims, and includes the equivalent meanings recited in the claims and all changes within the range.

Second Embodiment

Figure 11:
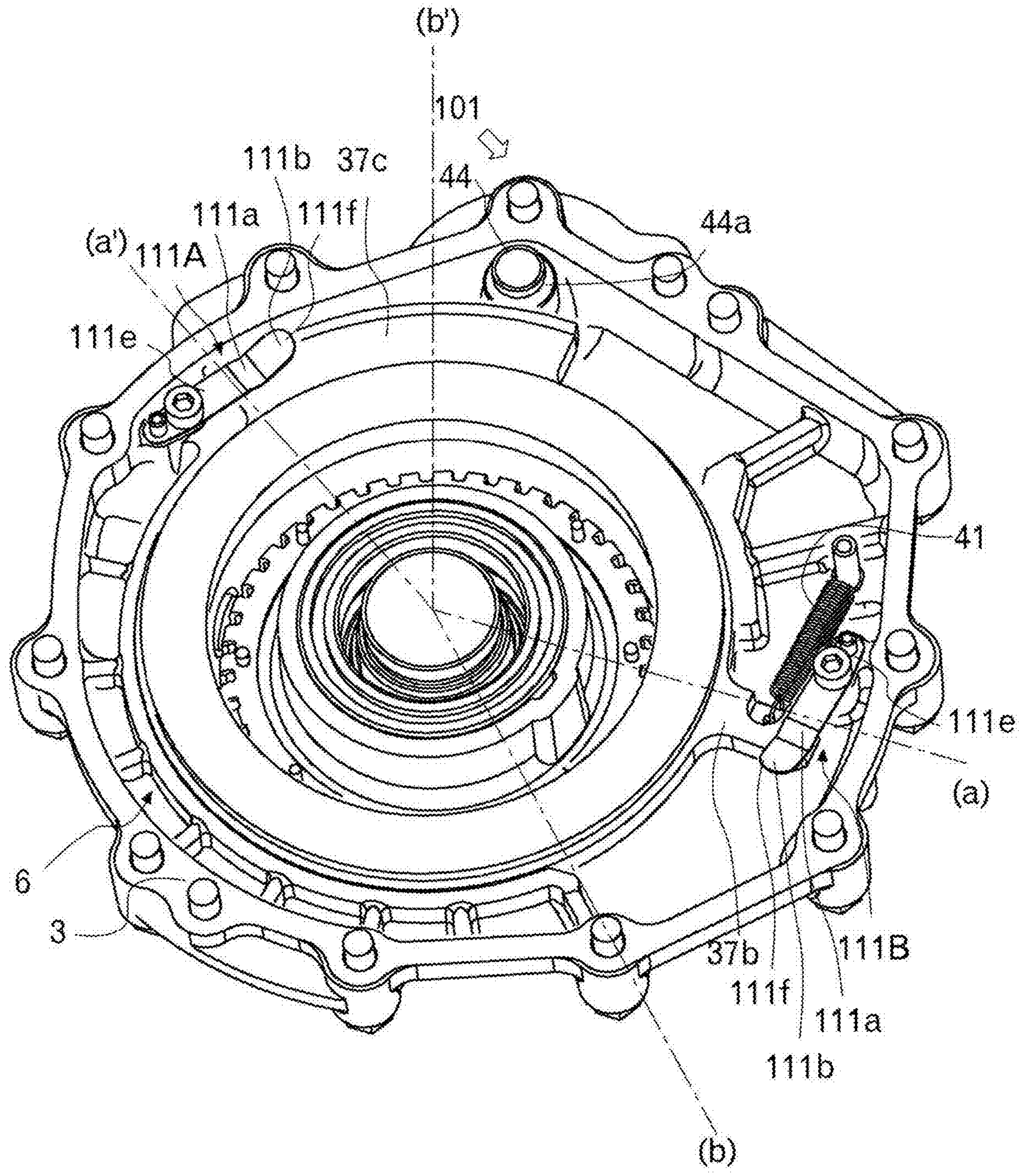
FIG. 11 is an explanatory view of operation in a differential limiting state showing a reaction plate and its peripheral parts mounted on an axle cover side according to another embodiment of the present disclosure.

Next, an axle driving device 101 according to a second embodiment of the present disclosure is described below. FIG. 11 is a perspective view of the axle driving device 101 with the axle cover removed. The axle driving device 101 according to the present embodiment includes energizing members 111A and 111B in the locking mechanism 6. Note that the configurations of members which are denoted by the same reference numerals as members of the first embodiment are the same as the configurations of the first embodiment, and descriptions thereof are omitted.

The energizing members 111A and 111B are members which apply energizing force to the reaction plate 37 in a direction away from the first friction plates 31 and the second friction plates 32 at the initial rotation position where the reaction plate 37 does not press the first friction plates 31 and the second friction plates 32.

In the first embodiment described above, the reaction plate 37 can be returned to the initial rotation position by the energizing force of the tension spring 41 when the electric motor 42 is not operated, but it is not possible to reliably ensure that the first friction plates 31 are retracted so as not to get in contact with the second friction plates 32 and the reaction plate 37 is returned to the initial rotation position. Therefore, notwithstanding that the differential lock is released, if both the first and second friction plates 31 and 32 come into contact with each other due to vibration or the like while the vehicle is traveling, there is a possibility that the turning feeling becomes unstable.

Accordingly, in the present embodiment, in addition to the first energizing member (tension spring) 41 which secures the initial rotation position of the reaction plate 37, second energizing members 111A and 111B which secure an initial axial position of the reaction plate 37 are provided on an inner wall surface of the right axle cover 9R.

Figure 12:
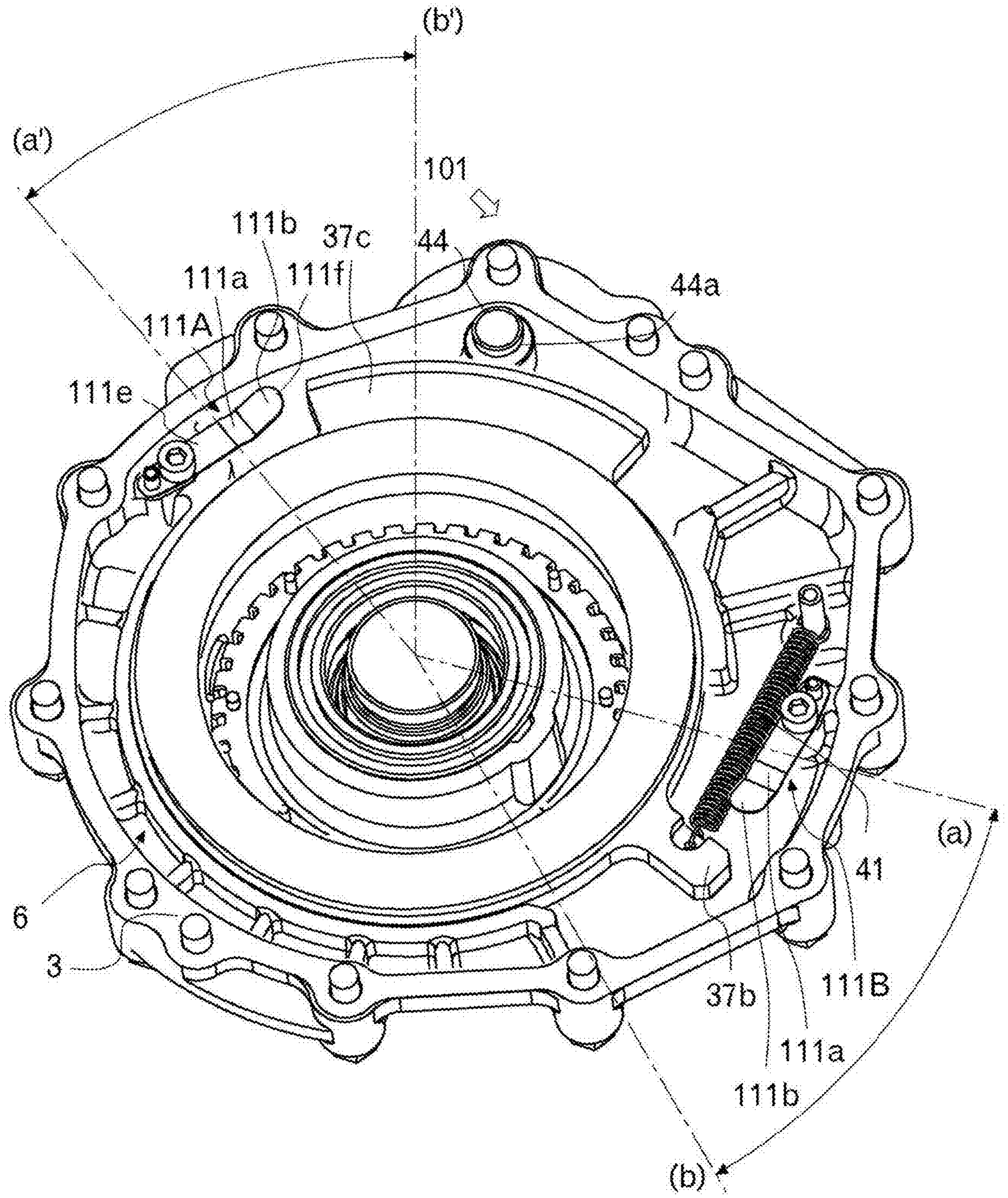
FIG. 12 is an explanatory view of operation in the differential lock state showing the reaction plate and its peripheral parts mounted on an axle cover side according to another embodiment of the present disclosure.

As shown in FIG. 11 and FIG. 12, the second energizing members 111A and 111B are disposed on the left side surfaces of the sector gear portion 37*c* and the arm portion 37*b*, which project radially outward from the outer circumferential edge portion of the reaction plate 37, so that the sector gear portion 37*c* and the arm portion 37*b* are able to abut to the second energizing members 111A and 111B in the vicinity of the rotation finished position of the reaction plate 37. FIG. 11 shows an abutting state, and FIG. 12 shows a non-abutting state.

In the rotation range of the reaction plate 37, a one-dot chain line (a) shown in FIG. 11 and FIG. 12 indicates a first rotation finished position of the arm portion 37*b* when the reaction plate 37 releases the differential lock, and a one-dot chain line (b) indicates a second rotation finished position of the arm portion 37*b* when the reaction plate 37 performs the differential lock. In addition, a one-dot chain line (a') indicates a first rotation finished position of the sector gear portion 37*c* when the differential lock of the reaction plate 37 is released, and a one-dot chain line (b') indicates a second rotation finished position of the sector gear portion 37*c* when the reaction plate 37 performs the differential lock.

Each of the second energizing members 111A and 111B is a leaf spring formed by pressing a tongue-shaped spring steel, and includes a base end portion 111*e*, a holder portion 111*a*, and a guide portion 111*b*. A longitudinal direction of each of the second energizing members 111A and 111B is along a rotation raceway of the arm portion 37*b* and the sector gear portion 37*c*. A positioning roll pin and a bolt are inserted into the base end portion 111 to fix each of the second energizing members 111A and 111B to the inner wall surface of the right axle cover 9R. The second energizing members 111A and 111B are fixed to positions adjacent to the first rotation finished positions (a') and (a), respectively, on the inner wall surface of the right axle cover 9R.

Figure 13:
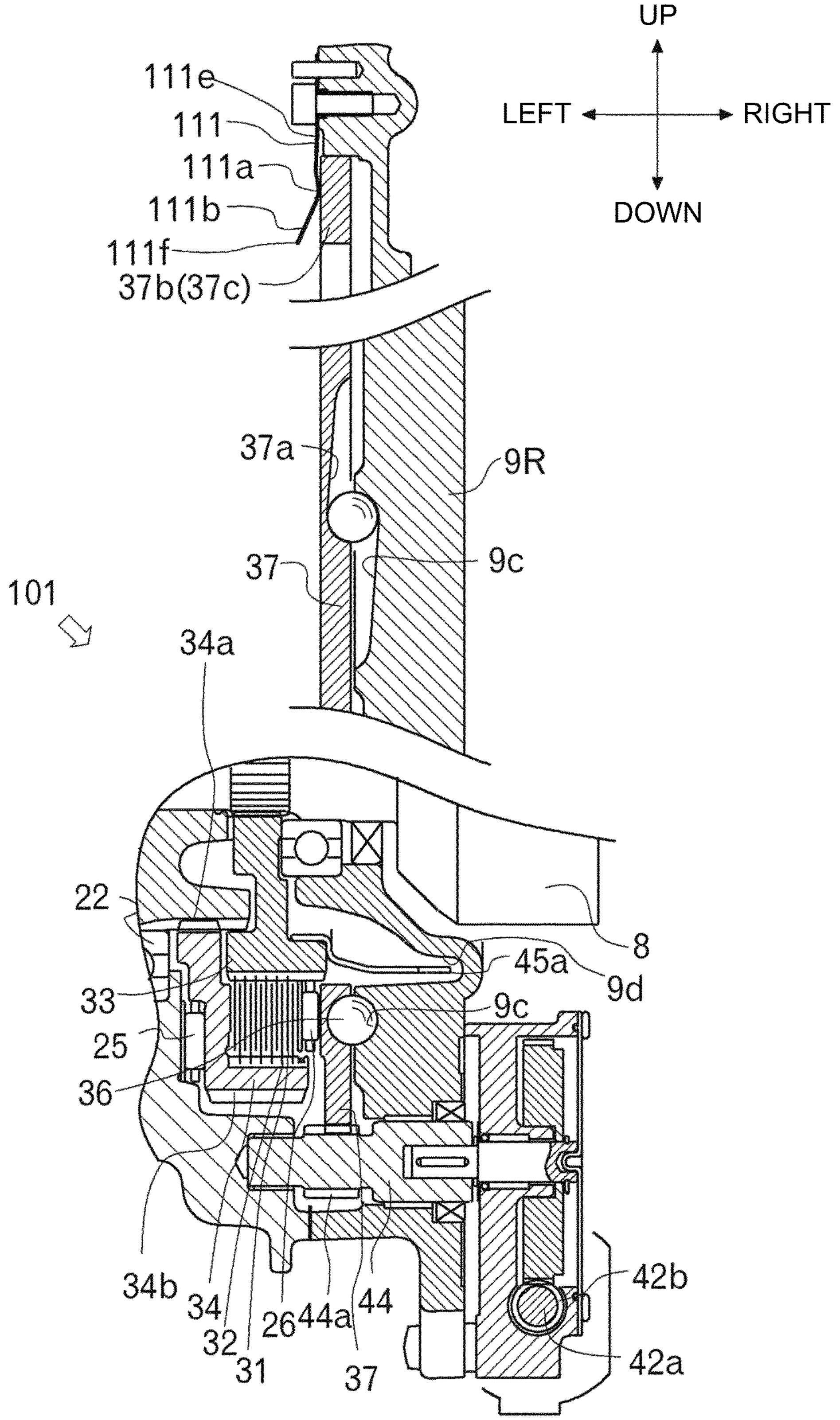
FIG. 13 is a partially enlarged front cross-sectional view showing the axle driving device with the differential lock released according to another embodiment of the present disclosure.

As shown in FIG. 13, the holder portion 111*a* gets in contact with the left side of the arm portion 37*b* (the sector gear portion 37*c*) which reaches the rotation finished position indicated by the one-dot chain line (a) and holds the arm portion 37*b* so as not to be displaced in the axial direction. An axial position of the reaction plate 37 at that time is defined as an initial axial position (the ball 36 is positioned at the deepest portion of the cam groove 9*c*).

The axial position of a tip portion 111*f* at a distal end of the guide portion 111*b* is set to be substantially equal to a position of the left side of the arm portion 37*b* when the arm portion 37*b* and the sector gear portion 37*c* are positioned at the second rotation finished positions (b) and (b'), respectively, and the reaction plate 37 projects to the axial maximum pressing position with respect to the first and second friction plates 31 and 32.

A portion connecting the tip portion 111*f* and the holder portion 111*a* is defined as the guide portion 111*b*. The guide portions 111*b* are inclined toward the second rotation finished position (b) and (b'), and when the reaction plate 37 rotates toward the first rotation finished position (a) and (a'), the circumferential edge portions of the arm portion 37*b* and the sector gear portion 37*c* abut to the guide portions 111*b*. Then, the rotational movement of the reaction plate 37 is converted into the axial movement such that the reaction plate 37 slides down along the inclined surface of the guide portion 111*b* toward the inner wall surface of the right axle cover 9R (toward the holder portion 111*a* side).

For example, as shown in FIG. 11, when the power supply to the electric motor 42 is cut off and the differential lock mechanism 6 is released to cause the locking differential gear assembly 5 to function, the reaction plate 37 receives the energizing force of the tension spring 41 and rotates toward the first rotation finished position (a) and (a').

As shown in FIG. 13. the guide portion 111*b* gets in contact with the left side of the sector gear portion 37*c*. The guide portion 111*b* also gets in contact with the left side of the arm portion 37*b*. Subsequently, the energizing force of the tension spring 41 is converted into thrust by the inclined surface of the guide portion 111*b*, causing the reaction plate 37 to displace from the left side to the right side, that is, in the direction opposite to the direction in which the friction plates are pressed. Subsequently, the reaction plate 37 is securely held in the non-pressing position by the holder portion 111*a*.

Figure 14:
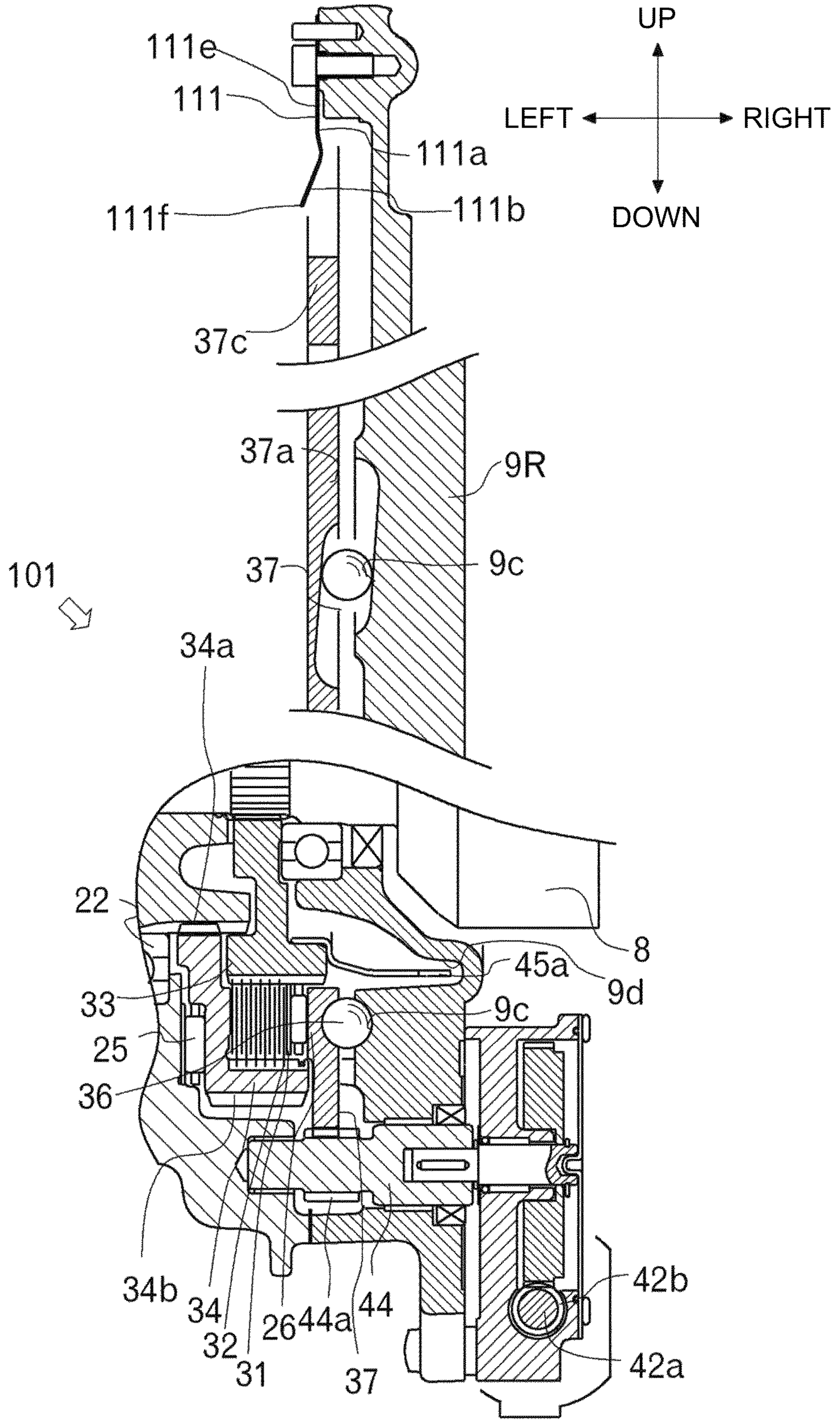
FIG. 14 is a partially enlarged front cross-sectional view showing the axle driving device with the differential lock operated according to another embodiment of the present disclosure.

On the other hand, as shown in FIG. 12 and FIG. 14, when the electric motor 42 is driven to rotate the reaction plate 37 in the direction in which the arm portion 37*b* and the sector gear portion 37*c* move from the first rotation finished positions (a) and (a') to the second rotation finished positions (b) and (b'), respectively, the ball ramp mechanism 36 generates the pressing force by which the reaction plate 37 presses the first and second friction plates 31 and 32. At this time, the arm portion 37*b* and the sector gear portion 37*c* of the reaction plate 37 get out from the second energizing members 111A and 111B and become a non-contact state, which never reduces the pressing force.

Figure 15A:
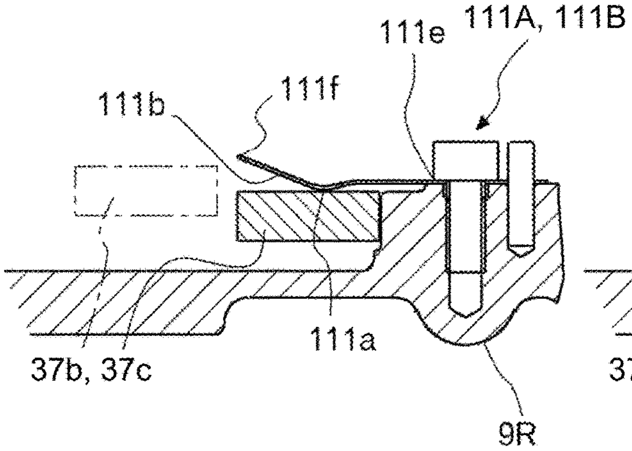
FIG. 15A is a cross-sectional view of a second energizing member formed of a leaf spring.

FIG. 15A illustrates states of the reaction plate 37 (differential lock to differential lock release) in which the rotational movement during the transition from the differential lock to the differential lock release is converted into the axial movement (thrust) by receiving the energizing force of the second energizing members 111A and 111B made of the leaf springs. As materials of the second energizing members 111A and 111B, hard members such as metals and industrial resins can also be applied in addition to elastic members such as leaf springs.

Figure 15B:
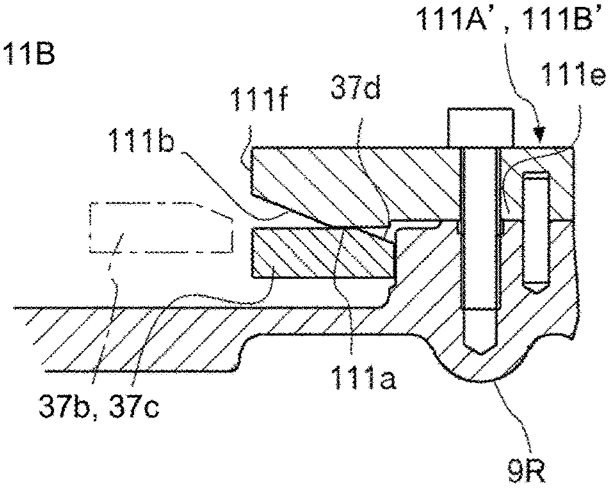
FIG. 15B is a cross-sectional view of a second energizing member formed of a leaf spring.

FIG. 15B illustrates the second energizing members 111A' and 111B' made of the hard members. The shape of the second energizing members 111A' and 111B' is the same as that of the second energizing members 111A and 111B in that both include the base end portion 111, the holder portion 111*a*, the guide portion 111*b*, and the tip portion 111*f*. Note that in order to increase the axial thrust in the direction in which the reaction plate 37 axially approaches the right axle cover 9R side (the holder portion 111*a* side) by the action of the guide portion 111*b*, an inclined surface 37*d* substantially parallel to the guide portion 111*b* is formed at the contact portion of each of the arm portion 37*b* and the sector gear portion 37*c*.

As described in the foregoing, when the reaction plate 37 does not press the first friction plates 31 and the second friction plates 32, the second energizing members 111A, 111B, 111A', and 111B' apply the energizing force to the reaction plate 37 in the direction away from the first and second friction plates 31 and 32 to prevent the reaction plate 37 from being displaced in the direction where the reaction plate 37 presses the first friction plates 31 and the second friction plates 32.

Such a configuration allows the differential lock release state to be reliably maintained as long as the differential lock operation is not instructed, thereby improving the turning feeling.

REFERENCE SIGNS LIST

1 Axle driving device
2 Front housing portion
3 Axle housing
3*a* Gear chamber
3*b* Wall
4 Input shaft
4*a* Small bevel gear
5 Locking differential gear assembly
6 Locking mechanism
7R, 7L Axle
9R, 9L Axle cover
11 Ring gear
12 Differential case
13 Pinion gear
14 Side gear
21 First bearing
22 Second bearing
25 First thrust bearing
26 Second thrust bearing
30 Clutch pack
31 First friction plate
32 Second friction plate
33 Clutch hub
34 Clutch housing
36 Ball ramp mechanism
37 Reaction plate
38 Cam ball
41 First energizing member (tension spring)
42 Electric motor
45 Detection cylinder
46 First rotation sensor
47 Second rotation sensor
111A, 111B Second energizing member (leaf spring)
111*a* Holder portion

111*b* Guide portion

111*e* Base end portion

111*f* Tip portion

The invention claimed is:

1. An axle driving device with a locking differential gear assembly having a clutch pack for restricting a differential function of a pair of right and left axles in an axle housing for rotatably bearing-supporting a differential case in which the pair of right and left axles are disposed, wherein the clutch pack includes a clutch housing, a first friction plate, a second friction plate, and a reaction plate, the clutch housing is engaged with the differential case so as to be relatively non-rotatable and axially movable, the second friction plate is engaged with the clutch housing and the first friction plate is engaged with one of the pair of right and left axles so that the first friction plate and the second friction plate are relatively non-rotatable and axially movable and are arranged in a superposing manner, the reaction plate is disposed adjacent to the first friction plate and the second friction plate and is capable of freely pressing the first friction plate and the second friction plate, the clutch housing is disposed opposite to the reaction plate across the first friction plate and the second friction plate so as to face a wall of the axle housing, and a first thrust bearing is disposed between the clutch housing and the wall of the axle housing, a clutch hub fitted to the one of the pair of right and left axles so as to be relatively non-rotatable is provided radially inside the clutch housing, the first friction plate is engaged with the clutch hub so as to be relatively nonrotatable and axially movable, and a first sensor to detect a rotational speed of the clutch hub and a second sensor to detect a rotational speed of the clutch housing are provided.

2. The axle driving device according to claim 1, wherein a ball ramp mechanism that generates a pressing force to press the first friction plate and the second friction plate when the reaction plate is rotated is provided between the reaction plate and the axle housing, and an energizing member is provided to hold the reaction plate at a position away from the first friction plate and the second friction plate when the reaction plate is at a rotational position where the reaction plate does not press the first friction plate and the second friction plate, and to release the holding of the reaction plate when the reaction plate is at a rotational position where the reaction plate presses the first friction plate and the second friction plate.

3. The axle driving device according to claim 2, wherein the energizing member includes a first energizing member that rotationally displaces the reaction plate from a state where the reaction plate presses the first friction plate and the second friction plate to a state where the reaction plate does not press the first friction plate and the second friction plate, and a second energizing member that generates an axial thrust to separate the reaction plate from the first friction plate and the second friction plate.

4. The axle driving device according to claim 3, wherein the second energizing member includes a base end to fix the second energizing member to the axle housing, a holder to hold the reaction plate at an axial position spaced apart from the first friction plate and the second friction plate, a tip provided apart from the base end in a rotational direction and an axial direction, and a guide that is formed in an inclined shape between the holder and the tip.

* * * * *